United States Patent [19]

Phelps

[11] 4,163,873

[45] Aug. 7, 1979

[54] TELEPHONE SOLID STATE RINGER

[75] Inventor: Robert J. Phelps, Fountain Valley, Calif.

[73] Assignee: Telephonic Equipment Corporation, Santa Ana, Calif.

[21] Appl. No.: 823,118

[22] Filed: Aug. 9, 1977

[51] Int. Cl.² ............................................ H04M 1/26
[52] U.S. Cl. ................................................ 179/84 T
[58] Field of Search .................. 179/84 R, 84 L, 84 T

[56] References Cited

U.S. PATENT DOCUMENTS

| 3,688,038 | 8/1972 | Hugyecz | 179/84 R |
|---|---|---|---|
| 3,808,379 | 4/1974 | Lind | 179/84 T |
| 3,849,606 | 11/1974 | Roberge | 179/84 T |
| 3,864,532 | 2/1975 | Van Der Plaats | 179/84 T |
| 3,867,585 | 2/1975 | Morstadt | 179/84 T |

OTHER PUBLICATIONS

Electronic Design, vol. 24, No. 22, Oct. 25, 1976, p. 194, H. MacDonald, "Circuit Monitors Blinking Phone Lights and Provides Soft but Commanding Tone."

Primary Examiner—Kathleen H. Claffy
Assistant Examiner—Joseph A. Popek
Attorney, Agent, or Firm—George F. Bethel; Patience K. Bethel

[57] ABSTRACT

The following specification discloses and teaches a solid state ringer or audible alarm for a telephone. The ringer can be connected to the tip and the ring sides (i.e., plus and minus terminals) of a telephone network in the home, or any other location. The ringer incorporates a rectifying bridge and a two terminal current regulator for providing current to the network on a regulated basis to eliminate undue irregularities on the line. The ringer can be rung on a duty cycle similar to a mechanical bell by means of charging a capacitor that discharges in accordance with the duty cycle of the mechanical ringer. The cycle is established through a timing network formed with a resistor within the timing loop incorporating the capacitor. The capacitor is discharged to power a speaker through a switching network by means of three transistors that provide a switching function. The discharge provides a voltage across an oscillatory network that allows a unijunction transistor to operate a speaker. The speaker is provided with a given voltage on an oscillatory basis within the range of eight hundred cycles per second during a duty cycle that would normally be the standard duty cycle of a telephone ring in an on and off relationship as to the sound thereof, thus providing a pleasant tone analogous to a mechanical ringer.

9 Claims, 1 Drawing Figure

U.S. Patent
Aug. 7, 1979
4,163,873
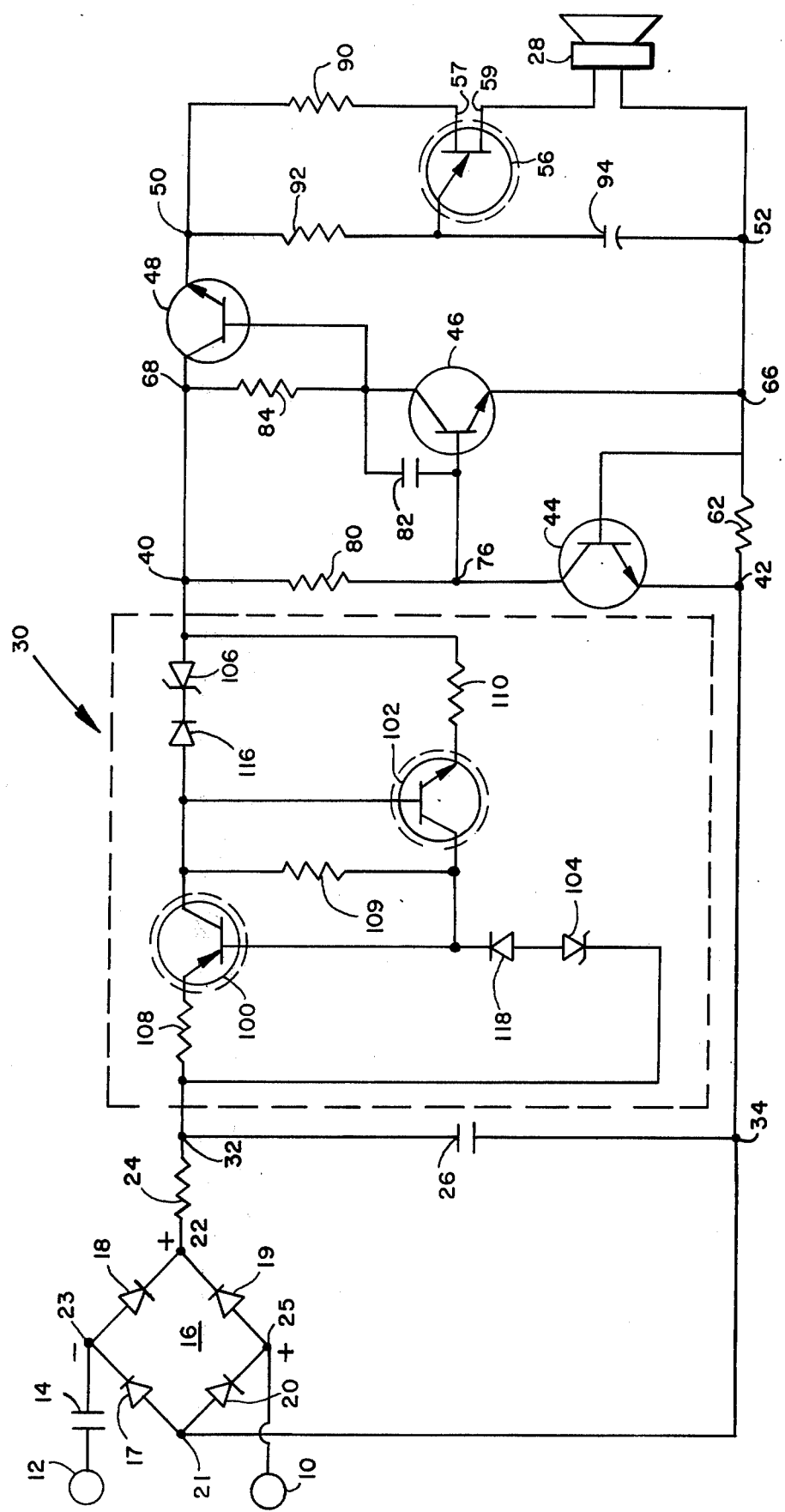

TELEPHONE SOLID STATE RINGER

BACKGROUND OF THE INVENTION

1. Field of the Invention

The field of this invention is within the audio alarm field. More specifically, the field of the invention resides within the telephone field as it relates to ringers and audible alarms for telephones.

2. The Prior Art

The background of the invention is such that it falls within the general telephone art as evolved over the years. It is customary to ring a prospective recipient of a call by means of having a buzzer alarm, or more generally, a mechanical ringer sound an alarm that the telephone subscriber or recipient is being called.

The recipient of a call in times past has been apprised of a call by means of applying an alternating current on the line connected to the recipient's telephone. This causes a mechanical ringing of a bell. The alternating current can be provided in numerous ways. Initially, it was provided by a hand crank turning a generator which allowed for the ringing to take place. However, recently, the utilization of alternating current provided from the central office imposed on the direct current on the line has been the accepted method of causing a ringer of the recipient to function.

In effect, a prospective recipient or subscriber of a telephone call is apprised of the fact that a call is being placed by means of alternating current originating from the central office in response to the switching network being actuated through the caller's dial or touch tone actuation who is originating the call.

The recipient of the call generally has the ringing take place within his telephone set. The ringing is caused by a bell which is implaced within the telephone set. The bell has a rotating or moving clapper that moves in response to the energization of a coil. The coil, of course, is energized by the AC in a duty cycle consistent with a desired ringing. The duty cycle can either be one second of ringing and three seconds off or two seconds of ringing and four seconds off, etc. Regardless of the duty cycle, the ringing takes place in response to the AC imposed on the line.

Recently, it has been customary to provide a subscriber or user of a telephone with a telephone that can be connected to multiple jacks throughout the building. In other words, the subscriber has a telephone line coming into his building connected to a series of jacks that can connect his telephone to a line connected to the central office. The tip and ring sides of the line, or the plus and minus side respectively of the jacks can be used for either plugging the telephone directly thereinto, or a ringer at particular jack locations. In other words, the telephone can be implaced in one particular location of the house or building and the ringer in another location. This allows flexibility so that ringing can take place in various locations, as well as allowing a telephone receiver to be implaced in various locations of the house.

Utilization of mechanical ringers for such purposes has been cumbersome at best. This is due to the fact that mechanical ringers are substantially bulky. Furthermore, mechanical ringers are known for their spurious bell tap noises. In other words, when a subscriber dials his phone, sometimes the bell will ring inadvertently on a tapping or mildly ringing basis. This is undesirable and tends to bother some subscribers. Additionally, mechanical ringers must be established with a certain degree of mechanical controls to provide certain ranges and degrees of loudness. This is sometimes difficult.

The instant invention overcomes not only the foregoing deficiencies, but also provides a solid state ringer that is substantially wear resistant and does not have any moving parts other than the speaker or transducer. As can be appreciated, a solid state electrical device is generally superior to a mechanical device in providing long range durability and service. Thus, the great number of service calls that are associated with mechanical ringers and mechanically operated telephones may be eliminated. Inasmuch as the telephone companies are moving more and more to solid state electrical devices, a solid state ringer is very compatible therewith.

To date, certain effects have been embarked upon in order to provide solid state ringers. Such efforts have not met with success. They usually involve a situation wherein an oscillator is connected to a telephone line.

Such oscillators are generally not maintained at a proper level for effective oscillation, or the lack of current regulation creates inordinate or irregular ranges or operation. They are often irregular in their operation and it is difficult to correct the disparate way in which they operate.

This invention solves the long felt need of a solid state ringer. It also effectively meets the standards of a telephone network to prevent bell tap as well as allow for a ringing on a consistent basis through an audio signal generated by a speaker driven in the manner to be described hereinafter. Furthermore, it does not unduly interfere with the stability of the telephone network into which it is connected.

SUMMARY OF THE INVENTION

In summation, this invention comprises a solid state ringer which utilizes a unijunction transistor for purposes of effectuating the ringing action thereof.

More particularly, this invention comprises a solid state ringer for utilization in a telephone network. The solid state ringer can be implaced across a tip and ring terminal of a telephone network and the respective current rectified in order to drive the ringer of this invention. The ringer incorporates a two terminal current regulator to finitely regulate the current. In this manner, a plurality, or a bank of ringers can be implaced across a telephone line to effectuate a ringing action without unduly disturbing the telephone network, or providing substantial losses on the line.

The ringer incorporates a speaker having a vibratory mode that is caused by a mechanical oscillation. The tone is within the relatively comfortable listening range of approximately eight hundred cycles per second.

The speaker is connected to the line in a manner to receive a driving voltage that has been regulated by the two terminal current regulator. The driving voltage is stored across a capacitor, which is switched on for purposes of driving the speaker through a series of switching transistors. The switching transistors are connected in a manner to provide a discrete switching of the voltage to an oscillating network that discharges through a unijunction transistor.

The unijunction transistor is particularly effective because of the fact that it fires in a precise and consistent manner and has a relatively high negative impedance. The high negative impedance allows the current at its junction to go into a negative mode and at the same time allow a continued function of the circuit. An RC network allows the discharge of the unijunction transistor on a cyclical basis for purposes of driving a speaker on a mechanically oscillatory basis.

It will be seen from the following specification that this invention has broad usage throughout the telephone art with respect to ringers and is particularly novel with regard to the utilization of a unijunction transistor to cause the sound to be emanated in the manner to be described hereinafter.

BRIEF DESCRIPTION OF THE DRAWINGS

The invention will be more clearly understood by reference to the description below taken in conjunction with the accompanying drawing wherein:

FIG. 1 shows a schematic view of the circuit of this invention with the electrical components detailed therein.

DESCRIPTION OF THE PREFERRED EMBODIMENTS

Looking at FIG. 1, it can be seen that a tip and ring connection, namely connections 10 and 12, are shown for a telephone line. The telephone line is one wherein a standard telephone signal is transmitted, as well as the AC signal for ringing purposes. Generally, the AC signal for ringing can be on a one or two second duty cycle wherein the phone rings for one second and is then off, or two seconds and is then off.

A capacitor 14 serves to block the DC components of the signal on the telephone line. However, it should be of sufficiently low enough impedance to pass 16 to $66\frac{2}{3}$ cycles to the network of this invention. The reason for the 16 to $66\frac{2}{3}$ cycles is that most telephone lines operate at anywhere from 16 to $66\frac{2}{3}$ cycles with regard to the AC ringing signal on the lines. This is due to the fact that some ringing functions originally were performed for party lines. In such cases, there were various cycles that were utilized for each respective party on the party lines and there had to be a range of ringing cycles. This was accommodated by the 16 to $66\frac{2}{3}$ range of the AC ringing signals.

A four way rectifying bridge 16 is shown having diodes 17, 18, 19 and 20. The bridge respectively provides for a minus and plus relationship at terminals 21 and 22, and a minus and plus relationship at terminals 23 and 25. The foregoing four way rectification not only rectifies the voltage of the AC signal for use with the circuit, but also serves to eliminate the requirement of havng a particular polarity for the circuit established at the connections to the tip or the ring side of the line. Thus, the terminals 23 and 25 can be placed across the tip and ring side of the line without any requirement of noting the respective polarity of the terminals to which they are connected.

Inasmuch as the current on the line can sometimes be relatively high with regard to the power requirements of the bell or the ringer and the current requirements are significantly lower in this particular invention, a current limiting resistor 24 is shown. The current limiting resistor 24 is such that it limits the current to the circuit so that the components therein will not be damaged. At the same time, resistor 24 allows the circuit to function in a manner consistent with the operation of the invention as described hereinafter. Ancillary to the foregoing function, the current limiting resistor 24 provides a series drop, as well as performing an RC function for purposes of changing a capacitor 26 at a given rate.

As previously stated, the capacitor 26 charges by means of the charging function provided by the resistor 24. The capacitor 26 fundamentally stores the supply or ringing voltage for the entire circuit that causes the power implaced on the coils of a speaker or transducer 28 as described hereinafter. The speaker or transducer 28 performs the function of providing the sound for the audible signal or ringing of the telephone.

In other words, the capacitor 26 has a voltage built up thereon, depending upon the value of the resistor 24 and serves to power the audible operative portions of the ringing circuit.

A two terminal current regulator that has been shown dotted in and labeled 30 is utilized for regulating the current to the circuit. The regulator 30 functions to provide the optimum current value without draining the telephone line or creating irregularities therein in the eventuality a plurality of ringers of this invention are implaced across a line. It serves to create stable conditions on a telephone line. The two terminal current regulator, although important for the operation of the invention, will be described in greater detail hereinafter in conjunction with the remaining portion of the circuit.

The capacitor 26 as previously stated, charges across points 32 and 34 on a duty cycle consistent with the one or two second duty cycle of the ringing voltage. This is normally applied on the telephone line across the terminals 10 and 12 respectively. In other words, it is customary to supply a ringing voltage across the tip and the ring sides of the line intermittently at prescribed intervals. In this manner, the capacitor 26 is charged at the foregoing duty cycle consistent with the resistance value of the resistor 24. The voltage built up across capacitor 26 discharges in the following manner to be described within the loop established across points 68 and 66.

Points 68 and 66 are fundamentally across capacitor 26. The points 68 and 66 are respectively at a plus and minus value within the circuit, depending upon the duty cycle of the ringing voltage established across the tip and the ring connections as previously stated.

There are three transistors that provide the switching function so that the voltage on the capacitor 26 will discharge and cause the speaker 28 to function in the manner that is to be described. These transistors are transistors 44, 46 and 48. The transistors 44, 46 and 48 are such that they have an off and on mode, depending upon the function that is to take place with respect to the speaker 28.

Transistor 44 is normally in the off condition until the voltage between its base and the emitter reaches approximately 0.7 volts. At this point, the transistor 44 will turn on.

Transistor 46 is normally in the on condition, while transistor 48 is in the off condition. This condition is during the buildup of the voltage on the capacitor 26. The foregoing transistor relationships allow for the full voltage to be placed across points 50 and 52 in order to operate the speaker 28 when a unijunction transistor 56 is discharged.

The loop created through the terminals 32, 34, 50 and 52 has a resistor 62 imposed therein. The resistor 62 provides the voltage drop thereacross in the circuit within the loop. Thus, the voltage is a function of the value of resistor 62 not only as it relates to the voltage within the loop previously alluded to, but also with respect to points 66 and 68. Points 66 and 68 are across the same points as capacitor 26, but have the resistor 62 interposed therebetween.

The foregoing situation is such that the voltage across resistor 62 and the attendant current therethrough being a function thereof, the current is controlled by the resistor. As the voltage builds up thereacross, if finally turns on transistor 44 which is off. Of course, transistor 46 being in the loop created through the foregoing terminals 66 and 68 and within the network wherein the resistor 62 is therein, creates a situation wherein the transistor 46 can be then turned off.

When transistor 44 has been turned on from its off condition, it permits point 76 which is connected to the base of transistor 46 to become negative. When point 76 becomes negative, the base of transistor 46 is negative, thereby turning transistor 46 off. This then allows a positive potential at point 68 to turn on transistor 48. Transistor 46 is, of course, biased by a resistor 80 in order to allow it to turn on when transistor 44 turns off.

The transistor 46 which goes from the on to the off condition, creates a situation wherein the current passing therethrough oscillates to some degree during its switching function when it turns off or on. In order to dampen the oscillatory switching function of transistor 46, a capacitor 82 is connected between its base and collector. A resistor 84 which is connected to the collector of the transistor 46 and point 68 develops the voltage to operate transistor 48. The resistor also serves as a clamping resistor to control the amount of current to maintain voltage developed across capacitor 26.

Resistor 84 fundamentally provides the threshold trip current to provide a bias on the transistor 48. Transistor 48 will remain on so long as there is a positive potential created through the voltage across capacitor 26 or until it has been diminished or dissipated.

When transistor 48 turns on, there is a positive potential at point 50. This can then cause the speaker to function with the potential being built up across points 50 and 52 that provides the voltage through the unijunction transistor 56. The unijunction transistor 56 has two bases, namely bases 57 and 59 which have to be protected from the substantial current which normally would ruin a unijunction transistor. This is accomplished by a resistor 90.

A resistor 92 and a capacitor 94 receive the operating voltage across points 50 and 52 in an oscillatory manner. In other words, resistors 92 and capacitor 94 establish an oscillatory network. Thus, any time the unijunction transistor 56 discharges, it discharges at a frequency established by the RC network between resistor 92 and capacitor 94.

The output of the speaker 28 is predicated upon the value of the resistor 92 and capacitor 94 to cause an oscillatory sound in the form of a ring, buzz, or other audible detection. The sound is consistent with the AC voltage developed across the tip and ring terminals 10 and 12 respectively which would normally provide the ringing of a mechanical bell. In this case, the two values of capacitors 92 and 94 have been selected to provide a rather pleasant tone of approximately eight hundred cycles per second.

The unijunction transistor 56 is particularly adapted for this invention. It is fundamentally a three terminal semi-conductor device which exhibits a stable N-type of negative resistance characteristic inbetween its emitter and Base-1 terminals when a positive bias is applied between its Base-1 and Base-2 terminals.

In some of its electrical characteristics the unijunction transistor resembles the gas thyratron tube. However, in general, its electrical characteristics are unique and there are no exact counterparts among either solid state or vacuum tube devices. Some of the more important applications of the unijunction transistor are a stable firing voltage which is a fixed fraction of the applied inter-base voltage, in other words, the voltage between the bases. Also, a very low firing current value is required.

More importantly, a negative resistance characteristic which is uniform with temperatue is incorporated in unijunction transistors. All these characteristics make the unijunction transistor advantageous in this particular invention. This is particularly true wherein a combination oscillator and trigger circuit is to be used for firing and providing the current to the speaker or transducer 28 on an appropriate oscillatory basis. The specific characteristics of the stable firing voltage are particularly helpful with the negative resistance characteristics in the circuit herein.

The speaker 28 has a coil with a resistance of approximately one hundred ohms. The foregoing resistance serves the function of helping to provide a voltage across the network by the unijunction transistor discharging therethrough. The unijunction transistor 56 with its negative impedance characteristics allows it to operate by virtue of the fact that as it discharges intermittently in response to the RC network established by resistor 92 and capacitor 94, the emitter thereof goes negative. The characteristics thereof allow it to regain its capability of discharging intermittently. It is found that the unijunction transistor under the foregoing conditions is particularly effective and is thus a substantial portion of this device.

Prior to the utilization of a unijunction transistor, if an oscillatory network were utilized, it was found to either create an undesirable bell tap, or other undesirable functions.

The two terminal current regulator 30 which has been dotted in, provides current regulation. It enables the voltage across the tip and the ring to be relatively stabilized within the network so that undue voltages are not drawn down from the line. Furthermore, it allows a plurality of at least five ringers or circuits of this invention to be placed across a single telephone line. Thus, it is of substantial value in this circuit but does not constitute the heart of the invention.

The two terminal current voltage regulator is utilized for stability of the current regulation. In this case it comprises a first transistor 100 and a second transistor 102. This establishes a voltage between the base emitter junction in cooperation with the zener diode 104 and 106. The two resistors 108 and 110 provide the current threshold at which the diodes 104 and 106 will function or regulate the voltage.

Diodes 116 and 118 merely serve to protect the circuit against reverse polarities, while resistor 109 is a divider. However, as can be understood, the zener diodes 104 and 106 in conjunction with the transistors fundamentally form the regulation function.

The reason for the utilization of the transistors in the network is that the beta of the transistors are utilized to create a more finite regulation. In effect, it creates an amplified regulatory function for the current. Although the zener diode itself, as previously alluded to, can be utilized with a transistor, a more finite utilization of the gain of the transistor with the zener effectuates a finer regulation of the current. The foregoing configuration also enhances the system from the standpoint of temperature changes. Although components 56, 100 and 102 have been shown with dotted circles illustrating heat sinks, they are optional, depending upon the overall design.

The speaker 28 can be substituted with any appropriate transducer wherein an electrical signal creates an audible vibrating mode. For example, a piezoelectric crystal, or standard telephone receiver capsule can be utilized. Also, devices having the same characteristic as the unijunction transistor 56 can be used. For instance, it is known in some cases that a tunnel or four layer diode can be connected in a manner to provide a similar function to a unijunction transistor (i.e., component 56).

As can be seen, the foregoing specification discloses a broad concept with regard to a solid state ringer for a telephone. The ringer is enhanced by means of a proper current regulation and the utilization of a rectifying bridge. More importantly, the invention utilizes a unijunction transistor and prevents oscillatory effects on the system from causing irregularities and spurious signals or undesirable instransients on the telephone line. It can be utilized in plural numbers to provide a phone jack connected placement in multiple locations on a telephone line. As a consequence, the invention is to be read broadly in light of the following claims.

I claim:
1. A solid state audible tone device comprising:
   terminal connection means for connecting said device to a telephone line;
   a rectifier connected across the terminals of said terminal connection means for connection to said device for rectifying AC signals at the terminals to a DC current;
   a voltage storage capacitor within said device for storing voltage supplied to the device from the connection means;
   switch means for switching the stored voltage from a stored condition to a current flowing condition therefrom when said voltage reaches a pre-established point;
   a means for regulating current having at least one zener diode coupled to the base of a transistor connected between said voltage storage capacitor and said switch means;
   a unijunction transistor connected to said switch means;
   an RC network connected between said switch means and said unijunction transistor to regulate the operation of said unijunction transistor; and,
   an audible vibratory means connected to said unijunction transistor which enunciates an audible signal when current flowing from said stored voltage is switched thereto by said switch means.
2. The device as claimed in claim 1 wherein said audible vibratory means comprises:
   a speaker.
3. The device as claimed in claim 1 wherein said current regulation means comprises:
   said current regulation means includes a second transistor and respective zener diode.
4. The device as claimed in claim 3 wherein said switching means comprises:
transistors wherein one of said transistors is in the off condition and is changed to an on condition when the voltage across a register reaches a certain limit within a loop including said voltage storage means.
5. A solid state ringer for a telephone comprising:
   a terminal connection means for connecting the ringer to a telephone line;
   voltage storage means within said ringer for storing voltage applied from said telephone line;
   a speaker connected to said voltage storage means;
   a unijunction transistor interposed between said speaker and said voltage storage means for applying the voltage from said voltage storage means to said speaker to generate an audio signal for apprising a telephone subscriber that someone is trying to reach him;
   a switching means interconnected between said voltage storage means and said unijunction transistor to cause said unijunction transistor to conduct upon switching thereof comprising a plurality of transistors wherein one of said transistors is in the off condition and is changed to an on condition when the voltage across a resistor reaches a certain limit within a loop including said voltage storage means; and,
   an RC network connected between said unijunction transistor and said switching means for causing said speaker to resonate at a prescribed frequency predicated upon the value of the RC network.
6. The solid state ringer as claimed in claim 5 further comprising:
   a rectifier interconnected between said telephone line and the ringer to rectify the AC current received from said telephone line when a normal voltage for ringing purposes takes place so that the voltage from the AC signal will be applied at a DC level to the voltage storage means in the ringer.
7. The solid state ringer as claimed in claim 6 further comprising:
   a current regulation means having at least one zener diode for regulating the current of said device.
8. The solid state ringer as claimed in claim 7 wherein:
   said current regulation means has a zener diode connected to a transistor at its base for regulating the current of said ringer.
9. A solid state ringer comprising:
   a terminal connecting point for connection to a telephone line including capacitance means for isolating direct current from said telephone line;
   voltage storage means electrically connected to said terminal connecting point;
   switching means connected to said voltage storage means comprising a plurality of transistors wherein one of said transistors is in the off condition and is changed to an on condition when the voltage across a resistor reaches a certain limit within a loop including said voltage storage means;
   a unijunction transistor connected to said switching means; and,
   for emanating an audible tone when said switch means allows current to flow from said voltage storage means to said unijunction transistor.

* * * * *